US012528678B2

(12) United States Patent
Blickle

(10) Patent No.: US 12,528,678 B2
(45) Date of Patent: Jan. 20, 2026

(54) LIFTING GEAR HAVING A LIFTING FRAME MOVABLE IN A MOVEMENT DIRECTION RELATIVE TO A SUPPORTING PART OF THE LIFTING GEAR, AND METHOD FOR OPERATING A LIFTING GEAR

(71) Applicant: SEW-EURODRIVE GMBH & CO. KG, Bruchsal (DE)

(72) Inventor: Rainer Blickle, Lyman, SC (US)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 237 days.

(21) Appl. No.: 18/274,113

(22) PCT Filed: Dec. 8, 2021

(86) PCT No.: PCT/EP2021/025485
§ 371 (c)(1),
(2) Date: Jul. 25, 2023

(87) PCT Pub. No.: WO2022/161588
PCT Pub. Date: Aug. 4, 2022

(65) Prior Publication Data

US 2024/0425333 A1 Dec. 26, 2024

Related U.S. Application Data

(60) Provisional application No. 63/141,637, filed on Jan. 26, 2021.

(30) Foreign Application Priority Data

May 7, 2021 (DE) ......................... 102021002427.3

(51) Int. Cl.
*B66F 3/02* (2006.01)
*B66F 3/44* (2006.01)
(Continued)

(52) U.S. Cl.
CPC .................. *B66F 3/02* (2013.01); *B66F 3/44* (2013.01); *B66F 17/00* (2013.01); *G06K 7/10297* (2013.01)

(58) Field of Classification Search
CPC .... B66F 3/02; B66F 3/44; B66F 17/00; B66F 5/02; B66F 7/02
(Continued)

(56) References Cited

U.S. PATENT DOCUMENTS 3,563,341 A 2/1971 Bultman
8,776,725 B1 * 7/2014 Grijalva ............... A01K 5/0114 119/51.01
(Continued)

FOREIGN PATENT DOCUMENTS

CN 201713264 U 1/2011
EP 2767500 A1 8/2014

OTHER PUBLICATIONS

International Search Report issued in corresponding International Application No. PCT/EP2021/025485 dated Apr. 8, 2022, pp. 1-2, English Translation.
(Continued)

*Primary Examiner* — Michael McCullough
*Assistant Examiner* — Jessica L Burkman
(74) *Attorney, Agent, or Firm* — Carter, DeLuca & Farrell LLP

(57) ABSTRACT

A lifting gear includes a lifting frame movable relative to a supporting part of the lifting gear in a movement direction. The supporting part is arranged on and connected to a base plate, at least one linear guide, at least one bus bar, and a gear rack are fixed in place on the supporting part, an electric motor is situated in the lifting frame, a toothed wheel meshes with the gear rack and is connected in a torsionally fixed manner to a shaft of the electric motor, and a lifting part is
(Continued)

connected to the lifting frame. The perpendicular projection of the lifting part onto a plane whose normal direction is aligned in parallel with the movement direction is included in, i.e., for example, encompassed by, the perpendicular projection of the base plate onto this plane.

34 Claims, 4 Drawing Sheets

(51) Int. Cl.
*B66F 17/00* (2006.01)
*G06K 7/10* (2006.01)

(58) Field of Classification Search
USPC .......................................................... 414/815
See application file for complete search history.

(56) References Cited

U.S. PATENT DOCUMENTS

| | | | | |
|---|---|---|---|---|
| 2010/0102284 | A1 | 4/2010 | Drake | |
| 2012/0325765 | A1 * | 12/2012 | Meyer | B66C 23/00 212/324 |
| 2021/0339991 | A1 * | 11/2021 | Russchen | B60B 29/001 |

OTHER PUBLICATIONS

International Report on Patentability issued in corresponding International Application No. PCT/EP2021/025485 dated Jul. 31, 2023, pp. 1-7, English Translation.

* cited by examiner

LIFTING GEAR HAVING A LIFTING FRAME MOVABLE IN A MOVEMENT DIRECTION RELATIVE TO A SUPPORTING PART OF THE LIFTING GEAR, AND METHOD FOR OPERATING A LIFTING GEAR

CROSS-REFERENCE TO RELATE APPLICATIONS

The present application, which is the national stage of PCT Application No. PCT/EP2021/025485, having an international filing date of Dec. 8, 2021, and which claims priority to Application No. 10 2021 002 427.3, filed in the Federal Republic of Germany on May 7, 2021, and to U.S. Provisional Application No. 63/141,637, filed on Jan. 26, 2021, each of which is expressly incorporated herein in its entirety by reference thereto.

FIELD OF THE INVENTION

The present invention relates to a lifting gear having a lifting frame which is, for example, situated so as to be movable in a movement direction relative to a supporting part of the lifting gear, and also relates to a method for operating a lifting gear.

BACKGROUND INFORMATION

In certain conventional systems, a lifting part is able to be vertically moved with the aid of a lifting gear.

SUMMARY

Example embodiments of the present invention provide a lifting gear that can be operated in a safe manner.

According to example embodiments of the present invention, a lifting gear includes a lifting frame situated so as to be movable relative to a supporting part of the lifting gear in a movement direction. The supporting part is arranged on a base plate and is connected to the base plate, and at least one linear guide, at least one bus bar, and a gear rack are fixed in place on the supporting part. An electric motor is situated in the lifting frame, a toothed wheel meshes with the gear rack and is connected in a torsionally fixed manner to a shaft of the electric motor, and a lifting part is connected to the lifting frame. A perpendicular projection of the lifting part onto a plane whose normal direction is aligned in parallel with the movement direction is included in, i.e., for example, encompassed by, the perpendicular projection of the base plate onto the plane.

Thus, the lifting gear is arranged and operable in a stable manner insofar as a rollover is prevented. In addition, the electromotive drive of the lifting frame is situated in the lifting frame itself and therefore protected. This is because the supporting part provides high stability and simultaneously allows for a precise mutual alignment of the linear guides, the gear rack, and the bus bars since all of these components are mounted on the same part. The relative alignment can thus be achieved in a simple and very precise manner during the assembly.

According to example embodiments, the lifting part is fastened to a front side of the lifting frame, and the base plate projects farther toward the front side than the lifting part, e.g., in order to prevent a rollover of the lifting gear. Thus, a rollover is prevented, and the safety is improved.

According to example embodiments, the base plate is made from steel, and the wall thickness of the base plate is greater than the wall thickness of the supporting part, e.g., of the rear wall of the supporting part. Thus, the base plate has a great weight and thus provides safety.

According to example embodiments, the electric motor includes a gear unit, the electric motor, thus, for example, being a geared motor, the shaft being the output shaft of the gear unit. Thus, a high torque is able to be generated, and a large mass can therefore be moved.

According to example embodiments, the gear unit has a self-locking configuration, e.g., so that the gear unit conducts a torque flow from the input shaft of the gear unit arranged as a rotor shaft of the electric motor, to the output shaft of the gear unit and inhibits a torque flow from the output shaft of the gear unit to the input shaft of the gear unit arranged as a rotor shaft of the electric motor. Thus, movement is prevented when the electric motor is not energized. Greater safety is therefore achieved.

According to example embodiments, the supporting part, e.g., a rear wall of the supporting part, is arranged as a first leg of an L-shaped part, and the base plate is placed on the other leg of the L-shaped part. Thus, great stability and, therefore, safety is able to be achieved.

According to example embodiments, the supporting part includes multiple parts, having two side wall parts and a rear wall connected to the side wall parts. Thus, a stable and economical configuration is provided.

According to example embodiments, a guide part is fastened to the lifting frame, which is in an operative connection with the linear guide. The guide part, for example, is made of two pieces, the two pieces of the guide part being set apart from each other in the movement direction. Thus, a very satisfactory alignment and excellent safety are achievable. Because of the spacing, the two pieces can be positioned at a great distance from each other so that great stability is able to be obtained.

According to example embodiments, two guide parts, e.g., guide parts that are situated at a distance from each other perpendicularly and/or transversely to the movement direction, are fastened to the lifting frame and positively connected to the linear guides, the guides having only a single translatory degree of freedom that provides for the linear movement of the guide parts and/or of the lifting frame along the linear guides. For example, great stability and thus safety are achievable using a minimum of material and mass.

According to example embodiments, brushes, which are in contact with the bus bars, are fastened to the lifting frame or to the electric motor. Thus, the lifting frame can be electrically supplied using an economical sliding-action contact.

According to example embodiments, a secondary winding, which is inductively coupled with at least one of the bus bars, is situated on the lifting frame or on the electric motor, and an alternating current is applied to the secondary winding. A capacitance is connected to the secondary winding in parallel or in series such that the resonant frequency of the oscillating circuit formed in this manner is similar to the frequency of the alternating current injected into the bus bar. A rectifier, which is situated on the lifting frame or on the electric motor and supplies the electric motor, is fed from the oscillating circuit, and, for example, a decoupling capacitor is situated on the direct-voltage-side connection of the rectifier, e.g., in parallel with the electric motor. Thus, a contact-free supply of the lifting frame is provided.

According to example embodiments, the bus bar is arranged as a tube half, e.g., as a copper tube half. This is consider advantageous because bus bars are easy to produce.

According to example embodiments, the rear wall is made from metal, and an electrical insulator is situated between the rear wall and the bus bar.

According to example embodiments, the rear wall is made from an electrically insulating material, e.g., plastic, and the bus bar rests against the rear wall.

Thus, great stability and safety is achievable.

According to example embodiments, an operator control unit, e.g., an HMI interface, is situated on the supporting part, e.g., on the upper end of the supporting part, and the operator control unit has at least one input element, e.g., a selector switch, a display device, and a microprocessor. Thus, great safety is achievable because the information is able to be displayed in a clearly visible manner and the operation can be carried out by pushing input device(s), e.g., a changeover switch or selector switch, in a vertical direction.

According to example embodiments, the microprocessor is connected to a reader device, e.g., an NFC reader device or an RFID reader device, and the microprocessor is configured such that, depending on the information read out from a tag, e.g., an RFID tag or an NFC tag, the lifting frame is driven to a linear position, e.g., to an upper or lower position. For example, the driving movement of the lifting frame will be stopped if the tag is located in the near range of the lifting frame, i.e., for example, if the perpendicular projection of the tag onto the plane is included in, and thus especially encompassed by, the perpendicular projection of the base plate onto this plane. The tag is, for example, situated on a mobile part, e.g., on a vehicle, on a domestic animal, or a person. Thus, the height position of the lifting gear is actuated as a function of the information stored on the tag and read out by the reader. In addition, the driving movement of the lifting frame is able to be stopped if the tag comes too close.

According to example embodiments, a current sensor is situated in the lifting gear, which acquires the current flowing through the bus bars, and the microprocessor is adapted to control the current flowing in the bus bars such that the acquired value of the current is compared to a threshold value, and if the threshold value is exceeded, the lifting gear is brought to a safe state, the current supply, for example, being switched off or the lifting gear being brought to a lower position. Thus, a safe state is actuated in the event of danger.

According to example embodiments, a current sensor, which acquires the current flowing through the bus bars, is situated in the lifting gear, and a sensor for acquiring the voltage applied at the electric motor is situated in the lifting gear. The microprocessor is adapted to control the current flowing in the bus bars such that the output of the electric motor is determined from the acquired current value and from the acquired voltage value, the presence of the containers and/or the mass accommodated in the containers is detected and/or determined from the output ascertained in this manner, and the lifting gear is brought to a safe state, the current supply, for example, being able to be switched off or the lifting gear being able to be brought to a lower position if the detected and/or determined mass exceeds a threshold value. Thus, a safe state is actuated in case of danger.

According to example embodiments of the present invention, in a method for operating a previously mentioned lifting gear, depending on the information read out from a tag, e.g., an RFID tag or an NFC tag, the lifting frame is driven to a linear position, e.g., to an upper or a lower position. For example, the driving movement of the lifting frame will be stopped if the tag is located in the near region of the lifting frame, i.e., for example, if the perpendicular projection of the tag onto the plane is included in, i.e., for example, by, the perpendicular projection of the base plate onto this plane. The tag is, for example, situated on a mobile part, e.g., on a vehicle, on a domestic animal, or on a person.

Thus, a safe state is actuated in case of danger. More specifically, this prevents the lifting part from being vertically driven onto the mobile part.

According to example embodiments, the current flowing through the bus bars is acquired and controlled such that after the acquired value of the current has been compared to a threshold value, the lifting gear is brought to a safe state if this threshold value has been exceeded, the current supply, for example, being switched off or the lifting gear being brought to a lower position. Thus, a safe state is actuated in the event of danger. More specifically, it prevents the lifting part from being vertically driven onto the mobile part.

According to example embodiments, the current flowing through the bus bars is acquired, the voltage applied at the electric motor is acquired, a measure of the output of the electric motor is determined therefrom, and from this measure, a value of a mass accommodated in the containers is determined, and/or the presence of the containers is detected. The lifting gear is brought to a safe state, the current supply, e.g., being switched off or the lifting gear being brought to a lower position, e.g., an end position, if the detected and/or determined mass exceeds a threshold value. In the other case, e.g., if no containers are present, the lifting frame is brought to an upper position, e.g., an end position. Thus, a safe state is actuated in the event of danger. More specifically, it is prevented that the lifting part is vertically driven onto the mobile part.

Further features and aspects of example embodiments of the present invention are described in greater detail below with reference to the appended schematic Figures.

DETAILED DESCRIPTION

Figure 1:
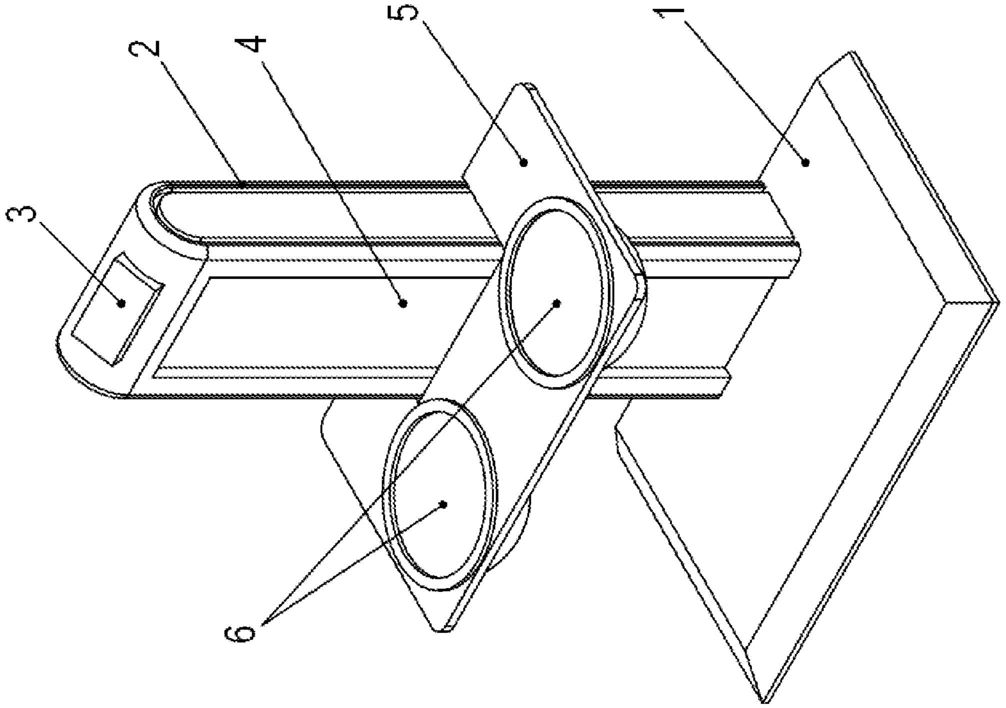
FIG. 1 is a perspective view of a lifting gear according to an example embodiment of the present invention having a folding wall 4 and a lifting part 5.
Figure 2:
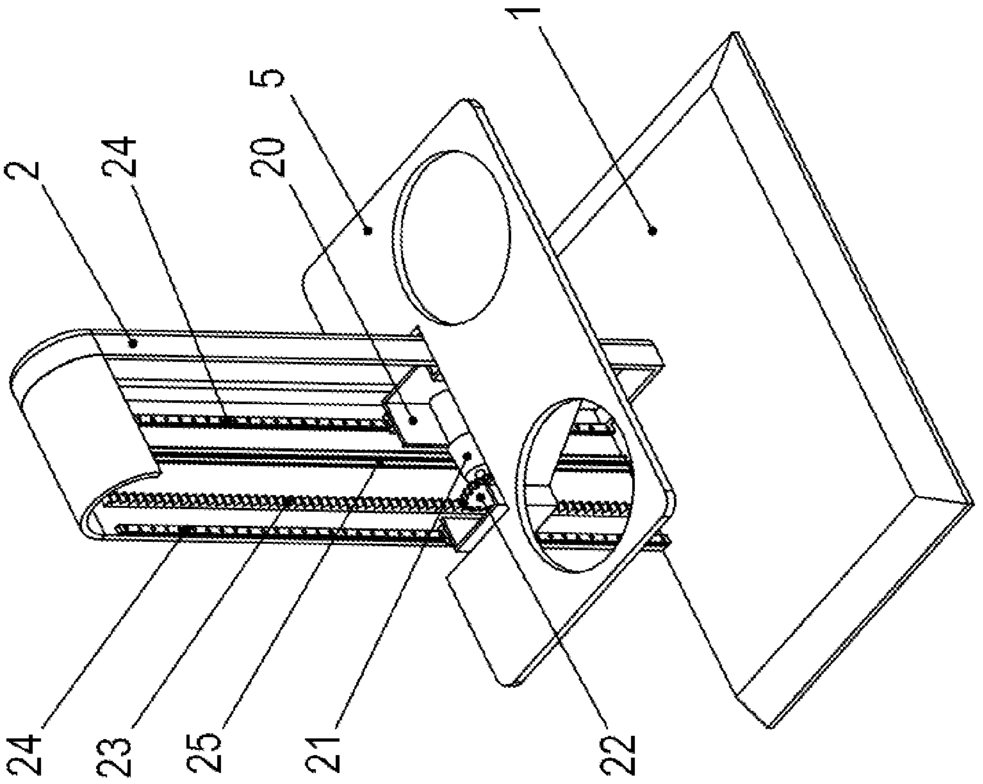
FIG. 2 is a cross-sectional view of the lifting gear.
Figure 3:
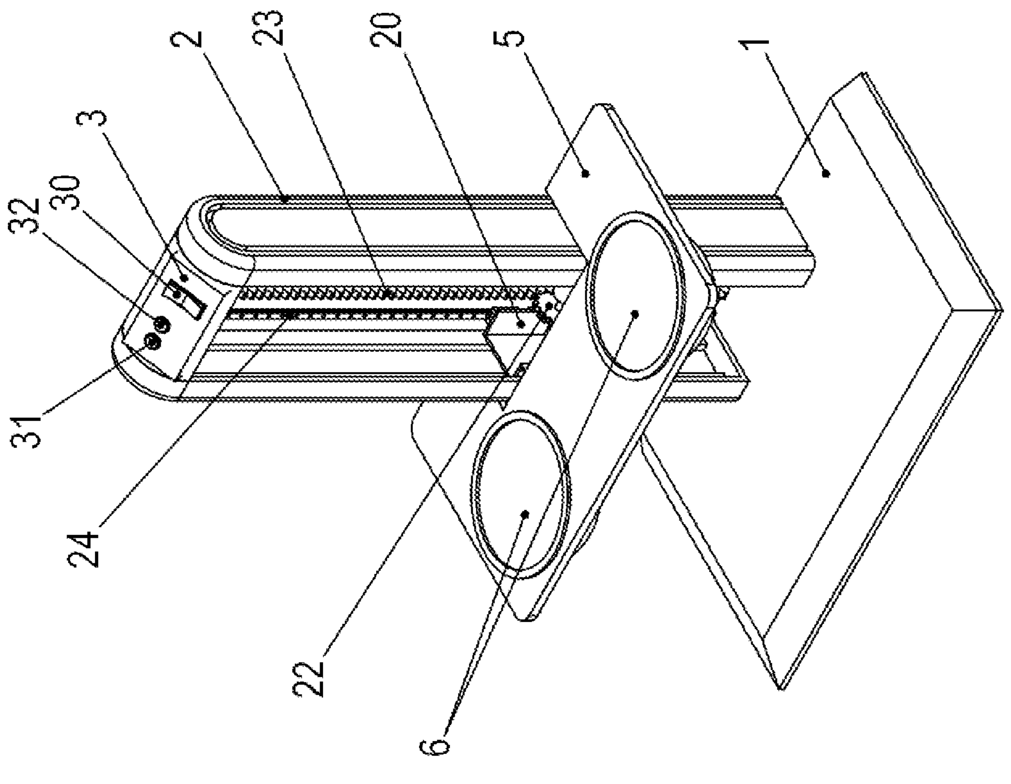
FIG. 3 illustrates the lifting gear without folding wall 4.
Figure 4:
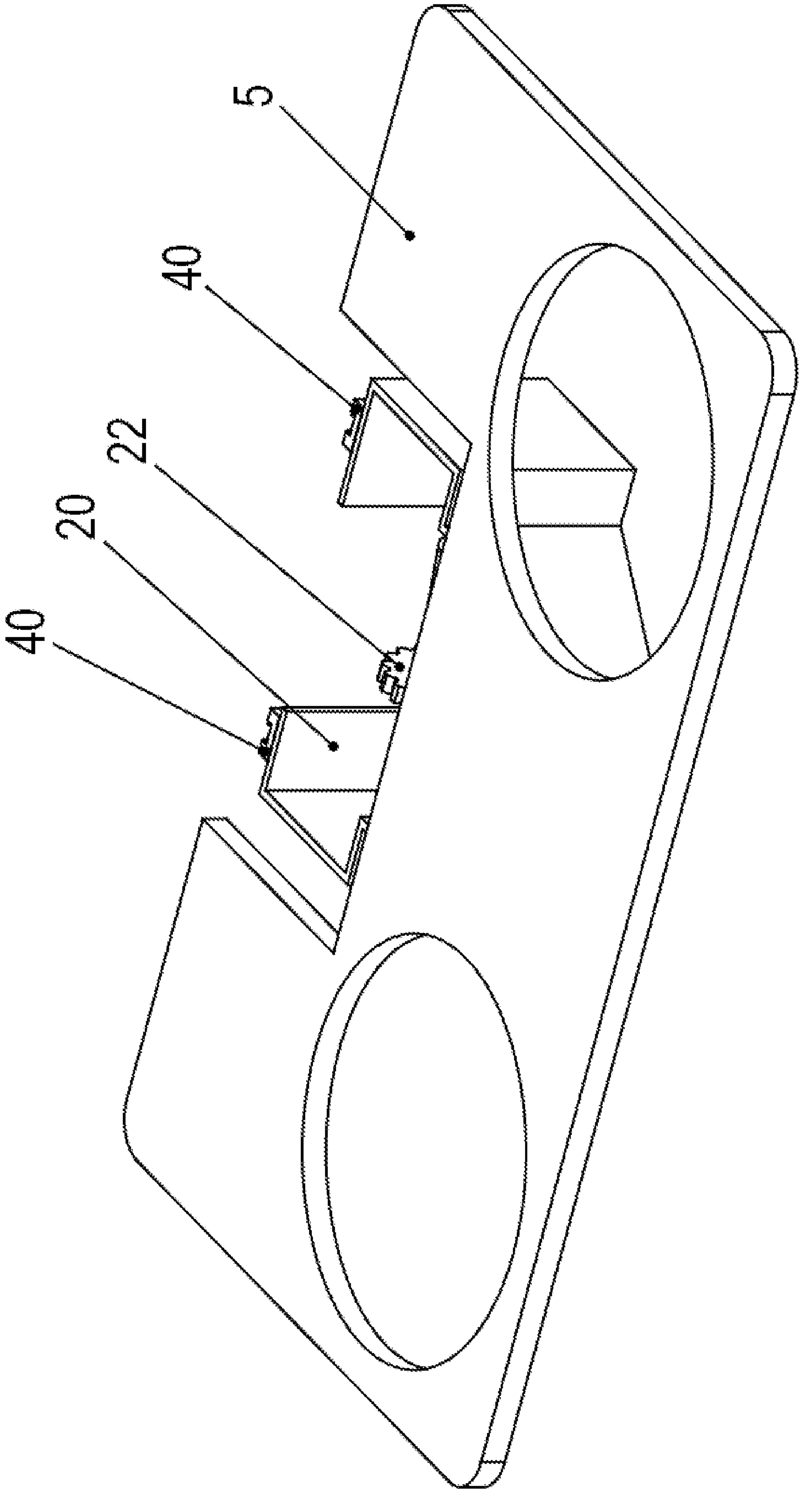
FIG. 4 is a perspective view of lifting part 5.

As illustrated in the Figures, the lifting gear has a base plate 1, which is, for example, made of steel.

A supporting part 2, which accommodates on its topside an operator control unit 3, e.g., an HMI interface, is fastened to base plate 1. Operator control unit 3 has input means and display devices 31, 32.

Provided as an input device is a selector switch 30 which is able to control the driving direction of lifting part 5 connected to lifting frame 20 in which an electric motor 21, e.g., a direct-current motor driving a toothed wheel 22 either directly or via an interposed gear, is accommodated.

Toothed wheel 22 meshes with a gear rack 23, which is secured in place on supporting part 2.

The lifting part has two recesses in which a container 6, e.g., a trough or a basin, is accommodated in each case.

A first recess is situated on a first side of a plane whose normal direction is aligned in parallel with the connecting line between the centroids of the two recesses, e.g., or the two containers 6. The plane, for example, intersects with bus bars 25, which are fixed in place on supporting part 2 and have a vertical orientation, i.e., extend lengthwise to supporting part 2, or intersects with gear rack 23.

The second recess is situated on the other side of the plane.

Sliding-action contacts, e.g., brushes by which electric current is able to be conducted from bus bars 25 for the electrical supply of electric motor 21, are situated on lifting frame 20. Only a single pair of bus bars 25 is, for example, provided, which allows for a direct-current supply of electric motor 21.

A folding wall 4 situated on supporting part 2 covers the interior space region surrounded by supporting part 2.

In a linear movement of lifting frame 20 along bus bars 25, the folding wall is displaced accordingly and covers the interior space region in all positions of lifting frame 20.

Gear rack 23 is situated in parallel with bus bars 25.

In addition, at least two linear guides 24 are situated on supporting part 2 in parallel with gear rack 23 and bus bars 25.

Linear guides 24 are, for example, aligned in the vertical direction, i.e., for example, in the direction of the gravitational field of the earth.

The polarity of bus bars 25, and, thus, the direction of rotation of electric motor 21 in the forward direction or the reverse direction, is able to be predefined with the aid of selector switch 30.

When electric motor 21 is operated in the forward direction, first display device 31, e.g., a light, is actuated. More specifically, first display device 31 lights up, but second display device 32 especially does not.

When electric motor 21 is operated in the reverse direction, second display device 32, e.g., a light, is actuated. More specifically, second display device 31 lights up, but first display device 31 especially does not.

Fixed in place on lifting frame 20 are two guide parts 40, which are set apart from each other and connected in a positive manner to linear guides 24, the guide parts having only a single degree of freedom that provides for the linear movement along linear guides 24.

Bus bars 25 and gear rack 23 are situated between the two linear guides 24.

Linear guides 24, bus bars 25, and gear rack 23, for example, are situated on a flat surface region of supporting part 2. The large space between the two linear guides 24 from each other makes it possible to achieve a stable linear guidance of lifting frame 20.

The region covered by lifting frame 20 in the movement direction, e.g., especially in the vertical direction, includes the region covered by toothed wheel 22 and electric motor 21, e.g., together with the gear unit, in the movement direction. Electric motor 21 together with toothed wheel 22 is therefore able to be fully accommodated in lifting frame 20. Moreover, a stable guidance is achievable because guide parts 40 extend over a great length in the movement direction.

In addition, a housing part of electric motor 21, e.g., the stator housing of electric motor 21, is connected to lifting frame 20, e.g., in a firm manner, and the rotor shaft of the electric motor is connected to toothed wheel 22 in a torsionally fixed manner and rotatably mounted in lifting frame 20 in the end region of the rotor shaft facing away from electric motor 21, e.g., with the aid of sliding bearings or antifriction bearings. Greater stability is therefore achievable.

Supporting part 2 is, for example, made up of multiple pieces and has two side wall parts and a rear wall which is connected to the side wall parts.

Base plate 1 is made from cast iron, cast steel, or an iron-containing material, for example. The rear wall of supporting part 2 ends flush with the edge of base plate 1. The perpendicular projection of lifting part 5 onto a plane whose normal direction is aligned in parallel with the movement direction is included in, and, thus, for example, encompassed by, the perpendicular projection of base plate 1 onto this plane. The base plate thus projects farther toward the front side than lifting part 5. This prevents the lifting gear from rolling over in the direction of lifting part 5.

The rear wall of supporting part 2, for example, leans or is placed against or is connected to a housing wall, for example. This prevents a rollover of the lifting gear either in the direction of the rear wall or the direction of lifting part 5.

The two side wall parts are also arranged as a guide for folding wall 4. Folding wall 4 is made from plastic, e.g., an elastic plastic, for example.

Lifting part 5 is produced from aluminum or wood, for example. For example, lifting frame 20 is made from metal, e.g., from aluminum.

Each guide part 40 is provided in two parts, these two parts of guide parts 40 being spaced apart from each other in the movement direction and mutually aligned in the movement direction. This achieves greater mechanical stability in the guidance. In addition, only short pieces are required, which saves material, and the pieces are mounted on lifting frame 20 as far apart from each other as possible in the movement direction, and, for example, are situated flush with an edge of lifting frame 20, i.e., with the upper edge or lower edge of lifting frame 20.

Bus bars 25 are, for example, able to be produced by halving a copper tube, the sectional plane, e.g., including the rotational symmetry axis of the cylindrical tube. Each bus bar 25 is therefore arranged as a cylinder half.

The brushes situated on lifting frame 20 are in sliding contact with bus bars 25. Because the bus bars have the semi-cylindrical depression, a reliable contact between the brushes and bus bars 25 is ensured. Proper dimensioning, e.g., a deep immersion, prevents the brushes or even only one of the brush hairs of the brushes from slipping out along the side.

Limit switches are also situated on supporting part 2, so that the current supply of the electric motor is terminated when contact occurs between the respective limit switch and lifting frame 20.

An electronic control having a microprocessor is situated in operator control unit 3 positioned on the upper side of supporting part 2. The microprocessor is supplied from a voltage regulator of the control, e.g., from a 5 Volt voltage regulator. The voltage regulator is supplied from a switched-mode power supply, which is supplied from a mains-fed rectifier on the input side. On the output side, the switched-mode power supply supplies a first supply voltage for the voltage regulator on the one hand, and a second supply voltage for a second voltage regulator on the other hand, e.g., an 18 Volt voltage regulator which feeds the electric motor via bus bars 25 and the sliding contact brought about with the aid of the brushes. The voltage supplied by the second voltage regulator is greater than the voltage supplied by the first voltage regulator. The same applies to the outputs supplied by the two voltage regulators. Situated between the second voltage regulator and the two bus bars 25 are controllable switches, e.g., relays. The actuation signals for the two controllable switches are provided by the microprocessor. Each bus bar is therefore able to be switched off separately.

The operator control unit has a selector switch 30 as an input device and controls first display device 31, e.g., a light, and second display device 32, e.g., a light, as a function of the input.

In addition, a reader device, e.g., an RFID reader device or an NFC reader device, is situated in the electronic control, the reader device being capable of reading out a tag within a range, e.g., an RFID tag or an NFC tag. The lifting frame is be moved as a function of the information stored in the tag, i.e., to an upper or a lower position. When selector switch 30 is operated, the information from the tag is given a lower priority and thus the movement direction specified by selector switch 30 is carried out.

For instance, a mobile part having the tag, e.g., a vehicle, a domestic animal, or a person, approaches the lifting gear. As soon as the tag is located within the range, lifting frame 20 is driven to the height associated with the information stored on the tag. For instance, it is driven to the upper position when a mobile part approaches that has the task of filling containers 6, while it is driven to the lower position when another mobile part approaches.

As a result, depending on the type of mobile part approaching the lifting gear, the lifting frame is brought to a different position.

However, if the mobile part comes too close to the lifting part or the lifting frame, the driving movement will be stopped so that no collision takes place between the mobile part and the lifting part in the movement direction. In other words, it is prevented that the lifting part is lowered onto the mobile part.

Since gear rack 23 is fixed in place on the rear wall of supporting part 2, as are linear guides 24 and bus bars 25, a highly precise alignment is able to be achieved in the movement direction. This is because the rear wall is produced as a single piece, which means that the relative orientation is established during the assembly of gear rack 23, linear guides 24, and bus bars 25. The rear wall is made of, for example, an electrically insulating material, e.g., plastic, or the rear wall is made from metal, e.g., aluminum or steel, and an insulator is interposed between bus bars 25 and the rear wall, the fastening screws pressing bus bars 25 against the rear wall also being made from an electrically insulating material.

In certain configurations, a self-locking gear unit, e.g., a worm gear, is interposed between the toothed wheel and the electric motor. In this manner, lifting frame 20 is secured in a high position even when the electric motor is switched off, that is to say, is not supplied with current. As an alternative or in addition, an electromagnetically operable brake is disposed on the motor. As a result, lifting frame 20 can be safely retained in a position.

In certain configurations, a current sensor which acquires the current flowing through the bus bars is mounted in the lifting gear. It is therefore possible to determine the output of the electric motor from the acquired current value and the voltage that supplies the electric motor. The output required during an empty trip, e.g., for the upward travel on the one hand and for the downward travel on the other, is stored in a memory which is connected to the microprocessor of the control. The acquisition of the output therefore makes it possible to determine not only the presence of containers 6 but also the mass held in containers 6. If the mass exceeds a threshold value, a warning is able to be displayed and/or the lifting gear be brought to a safe state, the current supply, for example, being able to be switched off or the lifting gear be brought to a lower position.

In certain configurations, an inductive supply is used in place of the sliding supply. To this end, the electronic control applies a medium-frequency alternating current to bus bars 25, the frequency of which amounts to between 10 kHz and 1 MHz, for example. Instead of the brushes, a secondary winding, which is inductively coupled with the bus bars, is situated on lifting frame 20. For example, an E-shaped ferrite core is fastened to the lifting frame, the secondary winding being wound onto the ferrite core. A center leg of the E-shaped ferrite core plunges between the two bus bars 25. The two other legs of the E-shaped ferrite core project next to bus bars 25 in the direction of supporting part 2. A capacitance is switched, or connected, in parallel or in series with the secondary winding and configured such that the resonant frequency of the oscillating circuit formed thereby is similar to the alternating current injected into bus bars 25. This makes it possible to achieve a high efficiency even with a low inductive coupling strength. A rectifier, which supplies the electric motor, is supplied from the oscillating circuit. A polarity reversal of the electric motor is able to be attained with the aid of a polarity-reversal unit which is situated between the rectifier and the electric motor, e.g., via controllable electronic semiconductor switches. The actuating signal for the polarity-reversal unit is transmitted by the control unit via the inductive coupling to the polarity-reversal unit situated on the lifting frame, which supplies a correspondingly polarized supply voltage to the electric motor, e.g., arranged as a direct current motor. For example, the polarity-reversal unit may also be implemented in the form of a relay so that an electrical cut-off of the electric motor is able to be induced as well.

LIST OF REFERENCE NUMERALS

1 base plate
2 supporting part
3 control unit, e.g., HMI interface
4 folding wall
5 lifting part
6 container, e.g., tub or basin
20 lifting frame
21 electric motor
22 geared wheel
23 gear rack
24 linear guide
25 bus bars
30 selector switch
31 first display device, e.g., light
32 second display device, e.g., light
40 guide part

The invention claimed is:

1. A lifting gear, comprising:
a base plate;
a support part arranged on and connected to the base plate;
a lifting frame movable relative to the support part in a movement direction,
a linear guide, a bus bar, and a gear rack fixed in place on the support part;
an electric motor arranged in the lifting frame and including a shaft;
a toothed wheel meshing with the gear rack and connected in a torsionally fixed manner to the shaft of the electric motor; and
a lifting part connected to the lifting frame;
wherein a perpendicular projection of the lifting part onto a plane having normal direction aligned in parallel with the movement direction is included in and/or encompassed by a perpendicular projection of the base plate onto the plane.

2. The lifting gear according to claim 1, wherein the lifting part is fastened to a front side of the lifting frame, and the base plate projects farther toward the front side than the lifting part.

3. The lifting gear according to claim 1, wherein the lifting part is fastened to a front side of the lifting frame, and the base plate projects farther toward the front side than the lifting part, to prevent a rollover of the lifting gear.

4. The lifting gear according to claim 1, wherein the base plate is made from steel, and a wall thickness of the base plate is greater than a wall thickness of the supporting part and/or a rear wall of the supporting part.

5. The lifting gear according to claim 1, wherein the electric motor includes a gear unit and is arranged as a geared motor.

6. The lifting gear according to claim 5, wherein the gear unit has a self-locking configuration.

7. The lifting gear according to claim 6, wherein the gear unit is adapted to conduct a torque flow from an input shaft of the gear unit arranged as a rotor shaft of the electric motor to an output shaft of the gear unit and to inhibit a torque flow from the output shaft of the gear unit to the input shaft of the gear unit.

8. The lifting gear according to claim 1, wherein the support part and/or a rear wall of the support part is arranged as a first leg of an L-shaped part and the base plate is arranged on another leg of the L-shaped part.

9. The lifting gear according to claim 1, wherein the supporting part includes multiple parts, having two side wall parts and a rear wall connected to the side wall parts.

10. The lifting gear according to claim 1, wherein a guide part is fastened to the lifting frame, in an operative connection with the linear guide.

11. The lifting gear according to claim 10, wherein the guide part includes two pieces set apart from each other in the movement direction.

12. The lifting gear according to claim 1, wherein the linear guide includes a plurality of linear guides, two guide parts, and/or guide parts that are arranged at a distance from each other perpendicularly and/or transversely to the movement direction, are fastened to the lifting frame and positively connected to the linear guides, the linear guides having only a single translatory degree of freedom that provides for linear movement of the guide parts and/or of the lifting frame along the linear guides.

13. The lifting gear according to claim 1, wherein the bus bar includes a plurality of bus bars, brushes in contact with the bus bars being fastened to the lifting frame and/or to the electric motor.

14. The lifting gear according to claim 1, wherein the bus bar includes a plurality of bus bars, a secondary winding inductively coupled with at least one of the bus bars being arranged on the lifting frame and/or on the electric motor, an alternating current being appliable to the secondary winding, a capacitance being connected to the secondary winding in parallel or in series such that a resonant frequency of an oscillating circuit is similar to a frequency of the alternating current, a rectifier being arranged on the lifting frame and/or on the electric motor and adapted to supply the electric motor adapted to be fed from the oscillating circuit.

15. The lifting gear according to claim 14, wherein a decoupling capacitor is arranged on a direct-voltage-side connection of the rectifier, in parallel with the electric motor.

16. The lifting gear according to claim 1, wherein the bus bar is arranged as a tube half and/or as a copper tube half.

17. The lifting gear according to claim 1, wherein a rear wall of the support part is made of metal, and an electrical insulator is arranged between the rear wall and the bus bar.

18. The lifting gear according to claim 1, wherein a rear wall of the support part is made of an electrically insulating material and/or plastic, and the bus bar rests against the rear wall.

19. The lifting gear according to claim 1, wherein an operator control unit is arranged on the supporting part and includes an input device, a display device, and a microprocessor.

20. The lifting gear according to claim 19, wherein the operator control unit includes an HMI interface, the operator control unit is arranged on an upper end of the support part, and the input device includes a selector switch.

21. The lifting gear according to claim 19, wherein the microprocessor is connected to a reader device and is adapted to drive the lifting frame, in accordance with information read out by the reader device from a tag, to a linear position.

22. The lifting gear according to claim 21, wherein the microprocessor is adapted to stop a driving movement of the lifting frame in response to the tag being located in a predetermined range of the lifting frame.

23. The lifting gear according to claim 21, wherein the microprocessor is adapted to stop the driving movement of the lifting frame in response to a perpendicular projection of the tag onto the plane being included in and/or encompassed by the perpendicular projection of the base plate onto the plane.

24. The lifting gear according to claim 21, wherein the tag is arranged on a mobile part, a vehicle, a domestic animal, and/or a person.

25. The lifting gear according to claim 21, wherein the reader device includes an NFC reader device and/or an RFID reader device, the tag includes an NFC tag and/or an RFID tag, the linear position includes an upper position and/or a lower position.

26. The lifting gear according to claim 21, wherein a current sensor is arranged in the lifting gear and is adapted to acquire current flowing through the bus bar, and the microprocessor is adapted to control the current flowing through the bus, the microprocessor adapted to compare an acquired value of the current to a threshold value and to, in response to the threshold value being exceeded, bring the lifting gear to a safe state, by switching off a current supply and/or moving the lifting gear to a lower position.

27. The lifting gear according to claim 21, wherein a current sensor adapted to acquire current flowing through the bus bar is arranged in the lifting gear, and a sensor adapted to acquire voltage applied at the electric motor is arranged in the lifting gear, the microprocessor adapted to control the current flowing through the bus bar and to determine an output of the electric motor from an acquired current value and from an acquired voltage value, to detect and/or determine a presence of containers and/or a mass accommodated in the containers from the output, and to bring the lifting gear to a safe state, by switching off a current supply and/or bringing the lifting gear to a lower position, in response to the mass exceeding a threshold value.

28. A method for operating a lifting gear as recited in claim 1, comprising driving the lifting frame to a linear position based on information read out from a tag.

29. The method according to claim 28, further comprising stopping a driving movement of the lifting frame in response to the tag being in a predetermined region of the lifting frame.

30. The method according to claim 28, further comprising stopping a driving movement of the lifting frame in response to a perpendicular projection of the tag onto the plane being included in and/or encompassed by the perpendicular projection of the base plate onto the plane.

31. The method according to claim 28, wherein the tag is arranged on a mobile part, a vehicle, a domestic animal, and/or a person.

32. The method according to claim 28, wherein the tag includes an NFC tag and/or an RFID tag, the linear position includes an upper position and/or a lower position.

33. The method according to claim 28, further comprising:

acquiring and controlling a current flowing through the bus bar;

comparing an acquired value of the current to a threshold value;

bringing the lifting gear to a safe state in response to the threshold value being exceeded, by switching off a current supply and/or bring the lifting gear to a lower position.

34. The method according to claim 28, further comprising:

acquiring a current flowing through the bus bar;

acquiring a voltage applied at the electric motor;

determining a measure of an output of the electric motor from the acquired current and/or the acquired voltage;

based on the measure of the output of the electric motor, determining a value of a mass accommodated in a container and/or detecting a presence of a container; and bringing the lifting gear to a safe state, by switching off a current supply and/or bring the lifting gear to a lower position and/or an end position, in response to the mass exceeding a threshold value, and bringing the lifting frame to an upper position and/or an end position, in response to a determination that no container is present.

* * * * *